United States Patent
Wang et al.

(10) Patent No.: US 10,110,426 B2
(45) Date of Patent: Oct. 23, 2018

(54) METHOD, APPARATUS, AND SYSTEM FOR IMPLEMENTING TUNNELING PROCESSING

(71) Applicant: Huawei Technologies Co., Ltd., Shenzhen, Guangdong (CN)

(72) Inventors: Yan Wang, Shanghai (CN); Weihua Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 14/699,718

(22) Filed: Apr. 29, 2015

(65) Prior Publication Data
US 2015/0244570 A1    Aug. 27, 2015

Related U.S. Application Data

(63) Continuation of application No. PCT/CN2012/083747, filed on Oct. 30, 2012.

(51) Int. Cl.
*H04L 12/24* (2006.01)
*H04L 29/12* (2006.01)
*H04L 12/911* (2013.01)

(52) U.S. Cl.
CPC .......... *H04L 41/0803* (2013.01); *H04L 41/08* (2013.01); *H04L 47/825* (2013.01); *H04L 61/2592* (2013.01)

(58) Field of Classification Search
CPC ............. H04L 41/0803; H04L 61/2592; H04L 47/825; H04L 41/08
See application file for complete search history.

(56) References Cited

U.S. PATENT DOCUMENTS

2011/0261825 A1 * 10/2011 Ichino ............... H04L 45/38
                                                               370/400
2012/0155467 A1     6/2012 Appenzeller
(Continued)

FOREIGN PATENT DOCUMENTS

CN    101325557 A    12/2008
CN    102301664 A    12/2011
(Continued)

OTHER PUBLICATIONS

Brandon Heller, OpenFlow Switch Specification, Jul. 20 2009, pp. 9-11.*
(Continued)

*Primary Examiner* — Chris Parry
*Assistant Examiner* — Soe M Hlaing

(57) ABSTRACT

The present invention discloses a method, an apparatus, and a system for implementing tunneling processing. The method for implementing tunneling processing includes: determining, by an openflow controller, matching field information, a tunneling protocol type, and a tunneling operation type of a data packet corresponding to tunneling processing; sending, by the openflow controller, first configuration information to an openflow forwarding apparatus; and sending, by the openflow controller, second configuration information to the tunneling protocol processing apparatus, where the second configuration information is used to give an instruction for processing, according to the tunneling operation type and the tunneling protocol type, the data packet matching the matching field information. The method, apparatus, and system for implementing tunneling processing according to the embodiments of the present invention can implement tunneling processing of multiple tunneling protocol types in an openflow network.

18 Claims, 8 Drawing Sheets

(56) References Cited

U.S. PATENT DOCUMENTS

2012/0303835 A1* 11/2012 Kempf ................ H04W 24/02
709/235
2013/0176850 A1* 7/2013 Mishra ................ H04L 49/00
370/235

FOREIGN PATENT DOCUMENTS

| CN | 102594697 A | 7/2012 |
| CN | 102739549 A | 10/2012 |
| WO | WO 2008/047930 A1 | 4/2008 |

OTHER PUBLICATIONS

"OpenFlow Switch Specification, Version 1.3.1 (Wire Protocol 0x04)", Open Networking Foundation, Sep. 6, 2012, 128 pages.

Florin Balus, et al., "Federated SDN-based Controllers for NVO3", Internet Engineering Task Force, Apr. 2013, 16 pages.

* cited by examiner

METHOD, APPARATUS, AND SYSTEM FOR IMPLEMENTING TUNNELING PROCESSING

CROSS-REFERENCE TO RELATED APPLICATIONS

This application is a continuation of International Application No. PCT/CN2012/083747, filed on Oct. 30, 2012, which is hereby incorporated by reference in its entirety.

TECHNICAL FIELD

The present invention relates to the communications field, and in particular, to a method, an apparatus, and a system for implementing tunneling processing in the communications field.

BACKGROUND

The openflow (OF for short) technology aims to convert, based on the transmission control protocol (TCP for short)/internet protocol (IP for short), a process of controlling and forwarding a data packet by a switch/router into a process of implementing data packet forwarding by an openflow switch and implementing data packet controlling by an openflow controller (also referred to as "openflow control server").

At present, in an OF network application, a tunneling technology is required to implement application scenarios such as access controlling, flexible networking, virtual private network service, and resource management. However, an OF network has limited capacity to support tunneling processing.

SUMMARY

Embodiments of the present invention provide a method, an apparatus, and a system for implementing tunneling processing, which can implement tunneling processing of multiple protocols on a data packet in an OF network.

In a first aspect, an embodiment of the present invention provides a method for implementing tunneling processing, including: determining, by an openflow controller, matching field information, a tunneling protocol type, and a tunneling operation type of a data packet corresponding to tunneling processing; sending, by the openflow controller, first configuration information to an openflow forwarding apparatus, where the first configuration information includes the matching field information and is used to give an instruction for sending a data packet matching the matching field information to a tunneling protocol processing apparatus; and sending, by the openflow controller, second configuration information to the tunneling protocol processing apparatus, where the second configuration information includes the tunneling operation type, the tunneling protocol type, and the matching field information, and is used to give an instruction for processing, according to the tunneling operation type and the tunneling protocol type, the data packet matching the matching field information, so that the tunneling protocol processing apparatus sends the processed data packet to the openflow forwarding apparatus.

In a first possible implementation of the first aspect, if the tunneling operation type is encapsulation, the method further includes: determining, by the openflow controller, other tunneling context information corresponding to the tunneling processing; and the second configuration information further includes the tunneling context information and is used to give an instruction for encapsulating, according to the tunneling context information and the tunneling protocol type, the data packet matching the matching field information.

With reference to the first aspect or the first possible implementation of the first aspect, in a second possible implementation, before the determining, by the openflow controller, the matching field information, the tunneling protocol type, and the tunneling operation type of the data packet corresponding to the tunneling processing, the method further includes: performing, by the openflow controller, tunneling negotiation with a tunnel peer node.

With reference to the first aspect, the first possible implementation of the first aspect, or the second possible implementation of the first aspect, in a third possible implementation of the first aspect, the method further includes: obtaining, by the openflow controller, a tunneling protocol type supported by the tunneling protocol processing apparatus; and determining, by the openflow controller, the tunneling protocol type as the tunneling protocol type supported by the tunneling protocol processing apparatus.

In a second aspect, an embodiment of the present invention provides a method for implementing tunneling processing, where the method includes: receiving, by a tunneling protocol processing apparatus, second configuration information sent by an openflow controller, where the second configuration information includes matching field information, a tunneling operation type, and a tunneling protocol type of a data packet corresponding to tunneling processing, and is used to give an instruction for processing, according to the tunneling operation type and the tunneling protocol type, a data packet matching the matching field information; receiving, by the tunneling protocol processing apparatus, a first data packet sent by an openflow forwarding apparatus; if the first data packet matches the matching field information, processing, by the tunneling protocol processing apparatus, the first data packet according to the tunneling operation type and the tunneling protocol type; and sending, by the tunneling protocol processing apparatus, the data packet obtained after processing the first data packet to the openflow forwarding apparatus.

In a first possible implementation of the second aspect, the method further includes: if the first data packet does not match the matching field information, sending, by the tunneling protocol processing apparatus, error indication information to the openflow controller, where the error indication information indicates that no second configuration information matches the first data packet.

With reference to the second aspect or the first possible implementation of the second aspect, in a second possible implementation of the second aspect, the method further includes: sending, by the tunneling protocol processing apparatus, a tunneling protocol type supported thereby to the openflow controller, so that the openflow controller sends the second configuration information according to the tunneling protocol type supported by the tunneling protocol processing apparatus.

With reference to the second aspect, the first possible implementation of the second aspect, or the second possible implementation of the second aspect, in a third possible implementation of the second aspect, if the tunneling operation type is encapsulation, the second configuration information further includes other tunneling context information corresponding to the tunneling processing, and the processing by the tunneling protocol processing apparatus, the first data packet according to the tunneling operation type and the tunneling protocol type includes: encapsulating, by the tunneling protocol processing apparatus, the first data packet according to the other tunneling context information and the tunneling protocol type.

In a third aspect, an embodiment of the present invention provides an openflow controller, including: a first determining unit, configured to determine matching field information, a tunneling protocol type, and a tunneling operation type of a data packet corresponding to tunneling processing; a first sending unit, configured to send first configuration information to an openflow forwarding apparatus, where the first configuration information includes the matching field information and is used to give an instruction for sending a data packet matching the matching field information to a tunneling protocol processing apparatus; and a second sending unit, configured to send second configuration information to the tunneling protocol processing apparatus, where the second configuration information includes the tunneling operation type, the tunneling protocol type, and the matching field information, and is used to give an instruction for processing, according to the tunneling operation type and the tunneling protocol type, the data packet matching the matching field information, so that the tunneling protocol processing apparatus sends the processed data packet to the openflow forwarding apparatus.

In a first possible implementation of the third aspect, if the tunneling operation type is encapsulation, the determining unit is further configured to determine other tunneling context information corresponding to the tunneling processing; and the second configuration information further includes the other tunneling context information and is used to give an instruction for encapsulating, according to the other tunneling context information and the tunneling protocol type, the data packet matching the matching field information.

With reference to the third aspect or the first possible implementation of the first aspect, in a second possible implementation of the third aspect, the openflow controller further includes a negotiating unit, where the negotiating unit is configured to perform tunneling negotiation with a tunnel peer node.

With reference to the third aspect, the first possible implementation of the third aspect, or the second possible implementation of the third aspect, in a third possible implementation of the third aspect, the openflow controller further includes an obtaining unit, where the obtaining unit is configured to obtain a tunneling protocol type supported by the tunneling protocol processing apparatus; and a second determining unit, configured to determine the tunneling protocol type as the tunneling protocol type supported by the tunneling protocol processing apparatus.

In a fourth aspect, an embodiment of the present invention provides a tunneling protocol processing apparatus, including: a first receiving unit, configured to receive second configuration information sent by an openflow controller, where the second configuration information includes matching field information, a tunneling operation type, and a tunneling protocol type of a data packet corresponding to tunneling processing, and is used to give an instruction for processing, according to the tunneling operation type and the tunneling protocol type, a data packet matching the matching field information; a second receiving unit, configured to receive a first data packet sent by an openflow forwarding apparatus; a processing unit, configured to process, when the first data packet matches the matching field information, the first data packet according to the tunneling operation type and tunneling protocol type; and a sending unit, configured to send the data packet obtained after processing the first data packet to the openflow forwarding apparatus.

In a first possible implementation of the fourth aspect, the tunneling protocol processing apparatus further includes an error indicating unit, configured to send, if the first data packet does not match the matching field information, error indication information to the openflow controller, where the error indication information indicates that no second configuration information matches the first data packet.

With reference to the fourth aspect or the first possible implementation of the fourth aspect, in a second possible implementation of the fourth aspect, the tunneling protocol processing apparatus further includes a reporting unit, configured to send a tunneling protocol type supported by the tunneling protocol processing apparatus to the openflow controller, so that the openflow controller sends the second configuration information according to the tunneling protocol type supported by the tunneling protocol processing apparatus.

With reference to the fourth aspect, the first possible implementation of the fourth aspect, or the second possible implementation of the fourth aspect, in a third possible implementation of the fourth aspect, if the tunneling operation type is encapsulation, the second configuration information further includes other tunneling context information corresponding to the tunneling processing, and the processing unit is specifically configured to encapsulate the first data packet according to the other tunneling context information and the tunneling protocol type.

In a fifth aspect, an embodiment of the present invention provides an openflow switch, including a tunneling protocol processing apparatus according to any one of the fourth aspect and the first possible implementation to the third possible implementation of the fourth aspect, and an openflow forwarding apparatus.

In a sixth aspect, an embodiment of the present invention provides a system for implementing tunneling processing, including an openflow controller according to any one of the third aspect and the first possible implementation to the third possible implementation of the third aspect, and a tunneling protocol processing apparatus according to any one of the fourth aspect and the first possible implementation to the third possible implementation of the fourth aspect.

In a seventh aspect, an embodiment of the present invention further provides an openflow controller, including a processor and a transceiver, where the processor is configured to determine matching field information, a tunneling protocol type, and a tunneling operation type of a data packet corresponding to tunneling processing; the transceiver is configured to send first configuration information to an openflow forwarding apparatus, where the first configuration information includes the matching field information and is used to give an instruction for sending a data packet matching the matching field information to a tunneling protocol processing apparatus; and the transceiver is further configured to send second configuration information to the tunneling protocol processing apparatus, where the second configuration information includes the tunneling operation type, the tunneling protocol type, and the matching field information, and is used to give an instruction for processing, according to the tunneling operation type and the tunneling protocol type, the data packet matching the matching field information.

In a first possible implementation of the seventh aspect, if the tunneling operation type is encapsulation, the processor is further configured to determine other tunneling context information corresponding to the tunneling processing; and correspondingly, the second configuration information further includes the other tunneling context information and is used to give an instruction for encapsulating, according to the other tunneling context information and the tunneling protocol type, the data packet matching the matching field information.

With reference to the seventh aspect or the first possible implementation of the seventh aspect, in a second possible implementation of the second aspect, the processor is further configured to perform tunneling negotiation with a tunnel peer node.

With reference to the seventh aspect, the first possible implementation of the seventh aspect, or the second possible implementation of the seventh aspect, in a third possible implementation of the seventh aspect, the transceiver is further configured to obtain a tunneling protocol type supported by the tunneling protocol processing apparatus. Correspondingly, the processor is further configured to determine the obtained tunneling protocol type as the tunneling protocol type supported by the tunneling protocol processing apparatus.

In an eighth aspect, an embodiment of the present invention provides tunneling protocol processing apparatus, including a transceiver and a processor, where the transceiver is configured to receive second configuration information sent by an openflow controller, receive a first data packet sent by an openflow forwarding apparatus, and send the data packet obtained after processing the first data packet to the openflow forwarding apparatus, where the second configuration information includes matching field information, a tunneling operation type, and a tunneling protocol type of a data packet corresponding to tunneling processing, and is used to give an instruction for processing, according to the tunneling operation type and the tunneling protocol type, the data packet matching the matching field information; and the processor is configured to process, when the first data packet matches the matching field information, the first data packet according to the tunneling operation type and the tunneling protocol type.

In a first possible implementation of the eighth aspect, the transceiver is further configured to send, if the first data packet does not match the matching field information, error indication information to an openflow controller, where the error indication information indicates that no second configuration information matches the first data packet.

With reference to the eighth aspect or the first possible implementation of the eighth aspect, in a second possible implementation of the eighth aspect, the transceiver is further configured to send a tunneling protocol type supported thereby to the openflow controller, so that the openflow controller sends the second configuration information according to the tunneling protocol type supported by the tunneling protocol processing apparatus.

With reference to the eighth aspect, the first possible implementation of the eighth aspect, or the second possible implementation of the eighth aspect, in a third possible implementation of the eighth aspect, if the tunneling operation type is encapsulation, the second configuration information further includes other tunneling context information corresponding to the tunneling processing; and correspondingly, the processor is specifically configured to encapsulate the first data packet according to the other tunneling context information and the tunneling protocol type.

In a ninth aspect, an embodiment of the present invention provides an openflow switch, including an openflow forwarding apparatus and a tunneling protocol processing apparatus according to anyone of the eighth aspect and the first possible implementation to the third possible implementation of the eighth aspect.

In a tenth aspect, an embodiment of the present invention provides a system for implementing tunneling processing, including an openflow controller according to any one of the seventh aspect and the first possible implementation to the third possible implementation of the seventh aspect, and a tunneling protocol processing apparatus according to any one of the eighth aspect and the first possible implementation to the third possible implementation of the eighth aspect.

The method, apparatus, and system for implementing tunneling processing according to the embodiments of the present invention implement tunneling processing of multiple tunneling protocol types in an openflow network. This tunneling processing solution is easy for deployment and makes small changes to an existing system.

BRIEF DESCRIPTION OF THE DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely apart rather than all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention may be applied to various communication systems, such as a global system for mobile communication (GSM for short) system, a code division multiple access (CDMA for short) system, a wideband code division multiple access (WCDMA for short) system, a general packet radio service (GPRS for short) system, a long term evolution (LTE for short) system, an LTE frequency division duplex (FDD for short) system, an LTE time division duplex (TDD for short) system, a universal mobile telecommunication system (UMTS for short), and a worldwide interoperability for microwave access (WiMAX for short) communication system. The embodiments of the present invention are not limited thereto.

It should be understood that, exemplarily, an openflow controller in the embodiments of the present invention refers to a device supporting an openflow controller function defined in an openflow protocol; an openflow forwarding apparatus in the embodiments of the present invention refers to an apparatus supporting a packet forwarding function defined in the openflow protocol, which may also be referred to as an openflow forwarding engine; and an openflow switch in the embodiments of the present invention includes the openflow forwarding apparatus, and refers to a device supporting a switch function defined in the openflow protocol. It should be understood that the foregoing concepts and names of the device and apparatus may vary with development of technologies and a change in an application scenario. Therefore, the embodiments of the present invention make no limited definition for the foregoing device and apparatus.

Figure 1:
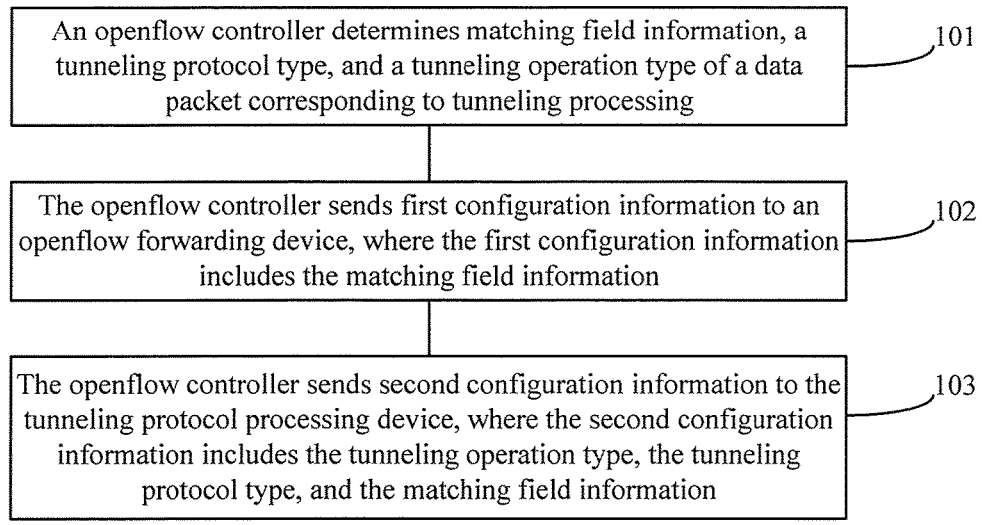
FIG. 1 is a schematic flowchart of a method for implementing tunneling processing according to an embodiment of the present invention.

FIG. 1 is a schematic flowchart of a method for implementing tunneling processing according to an embodiment of the present invention. The method illustrated in FIG. 1 is described from the point of an openflow controller. As shown in FIG. 1, the method includes:

101. An openflow controller determines matching field information, a tunneling protocol type, and a tunneling operation type of a data packet corresponding to tunneling processing.

Exemplarily, the matching field information may be information defined in the openflow protocol for matching a data packet, or other information that can identify a data packet; the tunneling protocol type may be the GPRS tunneling protocol (GTP), or the generic routing encapsulation protocol (GRE), or another tunneling protocol type; and the tunneling operation type may be a tunneling operation such as encapsulation, decapsulation, encryption, or decryption.

102. The openflow controller sends first configuration information to an openflow forwarding apparatus, where the first configuration information includes the matching field information. The first configuration information is used to give an instruction for sending a data packet matching the matching field information to a tunneling protocol processing apparatus.

Exemplarily, a flow modify message in the openflow protocol may be used to implement sending the first configuration information to the openflow forwarding apparatus. Specifically, the flow modify message carries the matching field information and action indication information, where the action indication information is used to give an instruction for sending the data packet matching the matching field information to the tunneling protocol processing apparatus. When an openflow switch receives the flow modify message, the openflow forwarding apparatus in the openflow switch generates a corresponding flow table entry according to the matching field information and the action indication information carried therein. When the openflow switch receives a data packet, a data packet forwarding apparatus may implement sending the data packet requiring tunneling processing to the tunneling protocol processing apparatus according to the flow table entry.

103. The openflow controller sends second configuration information to the tunneling protocol processing apparatus, where the second configuration information includes the tunneling operation type, the tunneling protocol type, and the matching field information. The second configuration information is used to give an instruction for processing, according to the tunneling operation type and the tunneling protocol type, the data packet matching the matching field information, so that the tunneling protocol processing apparatus sends the processed data packet to the openflow forwarding apparatus.

Exemplarily, one implementation is that: the openflow controller may define a tunneling configuration message, where the message may carry the tunneling operation type, the tunneling protocol type, and the matching field information. The tunneling protocol processing apparatus, upon receiving the tunneling configuration message, may generate a tunneling configuration table entry similar to the flow table entry and store it in a tunneling configuration table, where the tunneling configuration table entry includes the matching field information, the tunneling protocol type, and the tunneling operation type. The tunneling protocol processing apparatus, upon receiving the data packet and if the data packet matches matching field information of a tunneling configuration table entry, processes the data packet according to the corresponding tunneling protocol type and the tunneling operation type. Then, the tunneling protocol processing apparatus sends the data packet obtained after the tunneling processing to the openflow forwarding apparatus.

As an alternative method for implementing tunneling processing, if the tunneling operation type is encapsulation, in 101, the openflow controller further needs to determine other corresponding tunneling context information for performing tunneling encapsulation processing. In this case, the second configuration information sent by the openflow controller to the tunneling protocol processing apparatus further includes the other tunneling context information, and the second configuration information is used to give an instruction for encapsulating, according to the other tunneling context information and the tunneling protocol type, the data packet matching the matching field information.

As another alternative method for implementing tunneling processing, before 101, the openflow controller may further negotiate with a tunnel peer node, so as to determine information for performing tunneling processing, such as the tunneling protocol type and the tunneling context information.

As another alternative method for implementing tunneling processing, before 102, the openflow controller may further determine whether a tunneling protocol type corresponding to the tunneling processing is a tunneling protocol type supported by the tunneling protocol processing apparatus; if yes, select the tunneling protocol processing apparatus to perform the corresponding tunneling processing; if no, select another tunneling protocol processing apparatus supporting the tunneling protocol type to perform the corresponding tunneling processing. Exemplarily, the method for implementing tunneling processing illustrated in FIG. 1 may further include obtaining, by the openflow controller, a tunneling protocol type supported by the tunneling protocol processing apparatus; and determining, by the openflow controller, the tunneling protocol type as the tunneling protocol type supported by the tunneling protocol processing apparatus. The openflow controller may obtain the tunneling protocol type supported by the tunneling protocol processing apparatus by sending a request message and receiving a response message.

In the method for implementing tunneling processing illustrated in FIG. 1, the openflow controller sends the first configuration information to the openflow forwarding apparatus, so that the openflow forwarding apparatus sends the data packet requiring tunneling processing to the tunneling protocol processing apparatus; the openflow controller sends the second configuration information to the tunneling protocol processing apparatus, so that the tunneling protocol processing apparatus performs tunneling processing of different tunneling protocol types and different tunneling operation types on the corresponding data packet according to the second configuration information, and sends the data packet on which tunneling processing is performed to the openflow forwarding apparatus, so as to implement tunneling processing of multiple tunneling protocol types in an openflow network. This tunneling processing solution is easy for deployment and makes small changes to an existing system. A person skilled in the art may note that the method according to the embodiment of the present invention is applicable to a mobile communication network. Exemplarily, an mobility management network element may be used as the openflow controller, a service gateway may be used as the openflow switch, which includes the openflow forwarding apparatus, and a new network element of a core network may be provided to implement the function of the tunneling protocol processing apparatus, or the function of the tunneling protocol processing apparatus may be integrated in an existing network element of the core network.

Figure 2:
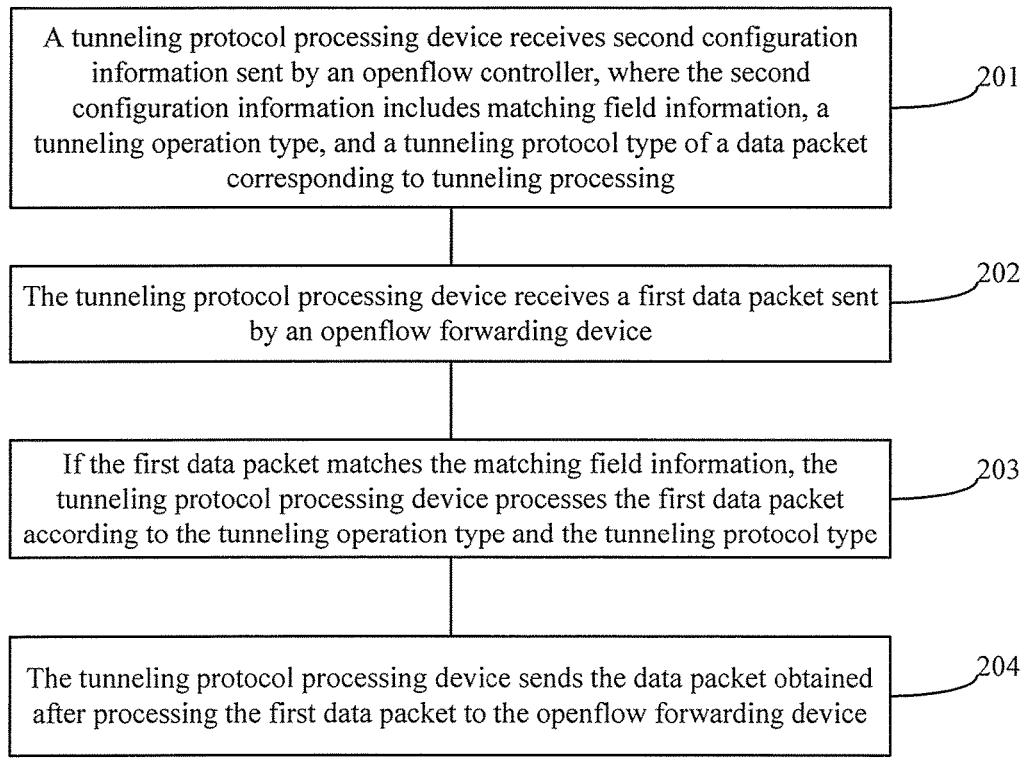
FIG. 2 is a schematic flowchart of another method for implementing tunneling processing according to an embodiment of the present invention.

The following describes the method for implementing tunneling processing according to an embodiment of the present invention from the point of a tunneling protocol processing apparatus by way of example. As shown in FIG. 2, the method includes:

201. A tunneling protocol processing apparatus receives second configuration information sent by an openflow controller, where the second configuration information includes matching field information, a tunneling operation type, and a tunneling protocol type of a data packet corresponding to tunneling processing.

The description of the embodiment illustrated in FIG. 1 may be referenced for the description and specific implementation examples of the second configuration information, the matching field information, the tunneling operation type, and the tunneling protocol type, which are not described repeatedly herein.

202. The tunneling protocol processing apparatus receives a first data packet sent by an openflow forwarding apparatus.

203. If the first data packet matches the matching field information, the tunneling protocol processing apparatus processes the first data packet according to the tunneling operation type and the tunneling protocol type.

Exemplarily, as a specific implementation, the tunneling protocol processing apparatus may maintain a tunneling configuration table including one or more tunneling configuration table entries. The tunneling configuration table entry is generated according to the received second configuration information, may include the matching field information, the tunneling operation type, and the tunneling protocol type, and may further include other tunneling context information for performing tunneling encapsulation processing. The tunneling protocol processing apparatus, upon receiving a data packet, matches the data packet with the tunneling configuration table entry in the tunneling configuration table; and if the data packet matches matching field information of a tunneling configuration table entry, performs tunneling processing on the data packet according to the tunneling operation type and tunneling protocol type in the tunneling configuration table entry.

204. The tunneling protocol processing apparatus sends the data packet obtained after processing the first data packet to the openflow forwarding apparatus.

Exemplarily, if the tunneling operation type is encapsulation, the data packet obtained after processing the first data packet is a data packet obtained after performing tunneling encapsulation on the first data packet; and if the tunneling operation type is decapsulation, the data packet obtained after processing the first data packet is a data packet obtained after performing tunneling decapsulation on the first data packet. The tunneling protocol processing apparatus can send the data packet obtained after performing processing to the openflow forwarding apparatus of the first data packet, or can send it to another network device for further processing and then sending to the openflow forwarding apparatus.

As another alternative method for implementing tunneling processing, if the first data packet does not match the matching field information, the tunneling protocol processing apparatus may send error indication information to the openflow controller, where the error indication information indicates that no second configuration information matches the first data packet, so that the openflow controller performs subsequent error handling, for example, delivers second configuration information matching the first data packet.

As another alternative method for implementing tunneling processing, the tunneling protocol processing apparatus may further send a tunneling protocol type supported thereby to the openflow controller, so that the openflow controller may send the second configuration information according to the tunneling protocol type supported by the tunneling protocol processing apparatus.

As another alternative method for implementing tunneling processing, if the tunneling operation type is encapsulation, the second configuration information further includes tunneling context information corresponding to the tunneling processing; and correspondingly, in 203, the tunneling protocol processing apparatus encapsulates the first data packet according to the tunneling context information and the tunneling protocol type.

In the method for implementing tunneling processing illustrated in FIG. 2, the tunneling protocol processing apparatus receives the second configuration information sent by the openflow controller; and upon receiving the data packet which can match the matching field information in the second configuration information, processes the data packet according to the tunneling operation type and the tunneling protocol type in the second configuration information, and sends the data packet obtained after processing to the openflow forwarding apparatus, which implements tunneling processing of multiple tunneling protocol types in an openflow network. This tunneling processing solution is easy for deployment and makes small changes to an existing system.

The following provides an exemplary description of the method for implementing tunneling processing according to the embodiment of the present invention with reference to a specific scenario.

Figure 3:
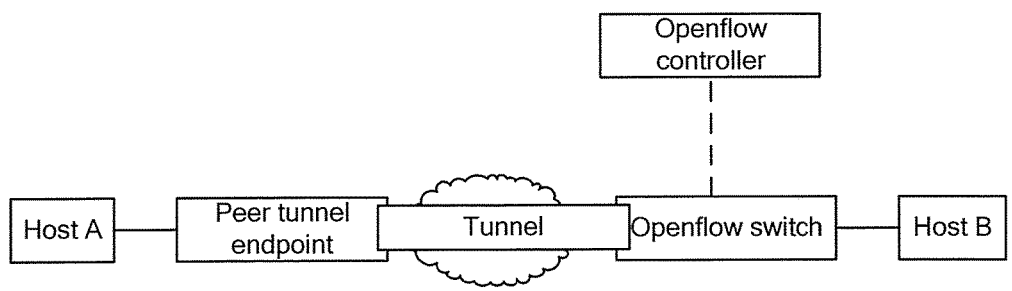
FIG. 3 is a schematic diagram of network architecture according to an embodiment of the present invention.

FIG. 3 is a schematic diagram of network architecture set up between an openflow switch and a peer tunnel endpoint. The peer tunnel endpoint may be a network element device that does not support the openflow protocol. As shown in FIG. 3, a host A is connected to a peer tunnel endpoint; the peer tunnel endpoint sets up a tunnel with an openflow switch; an openflow controller is connected to the openflow switch; and a host B is connected to the openflow switch. The openflow switch includes an openflow forwarding apparatus. A data packet sent by the host A to the host B needs to go through the tunnel between the peer tunnel endpoint and the openflow switch.

In order to implement the method for implementing tunneling processing according to the embodiment of the present invention, a tunneling protocol processing apparatus may be provided in the network architecture illustrated in FIG. 3.

Figure 4:
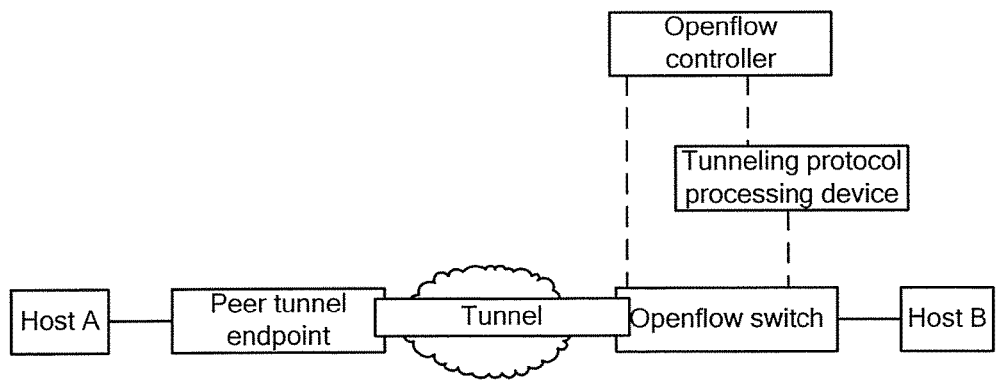
FIG. 4 is a schematic diagram of network architecture according to an embodiment of the present invention.

Exemplarily, as shown in FIG. 4, a tunneling protocol processing apparatus may be independently provided in the network. The openflow switch is connected to the tunneling protocol processing apparatus, and the openflow controller is connected respectively to the tunneling protocol processing apparatus and the openflow switch. According to the method for implementing tunneling processing according to the embodiment of the present invention, the openflow controller sends a first configuration message to the openflow switch, that is, send first configuration information to an openflow forwarding apparatus, and the openflow controller sends second configuration information to the tunneling protocol processing apparatus. When a host A wants to send a data packet to a host B, the host A first sends the data packet to a peer tunnel endpoint; the peer tunnel endpoint performs tunneling encapsulation, for example, GTP tunneling encapsulation, on the data packet, and sends the encapsulated tunneling data packet to the openflow switch through the tunnel; the openflow switch, upon receiving the tunneling data packet sent by the peer tunnel endpoint, forwards the tunneling data packet to the tunneling protocol processing apparatus according to the first configuration information; the tunneling protocol processing apparatus decapsulates the tunneling data packet, and returns the decapsulated data packet to the openflow switch; and the openflow switch sends the decapsulated data packet to the host B. When the host B needs to send a data packet to the host A, the tunneling protocol processing apparatus may send an encapsulated tunneling data packet to the openflow switch, and the openflow switch sends the encapsulated tunneling data packet to the peer tunnel endpoint through the tunnel. It should be noted that the tunneling protocol processing apparatus provided independently in the network architecture may be connected to multiple openflow switches.

Figure 5:
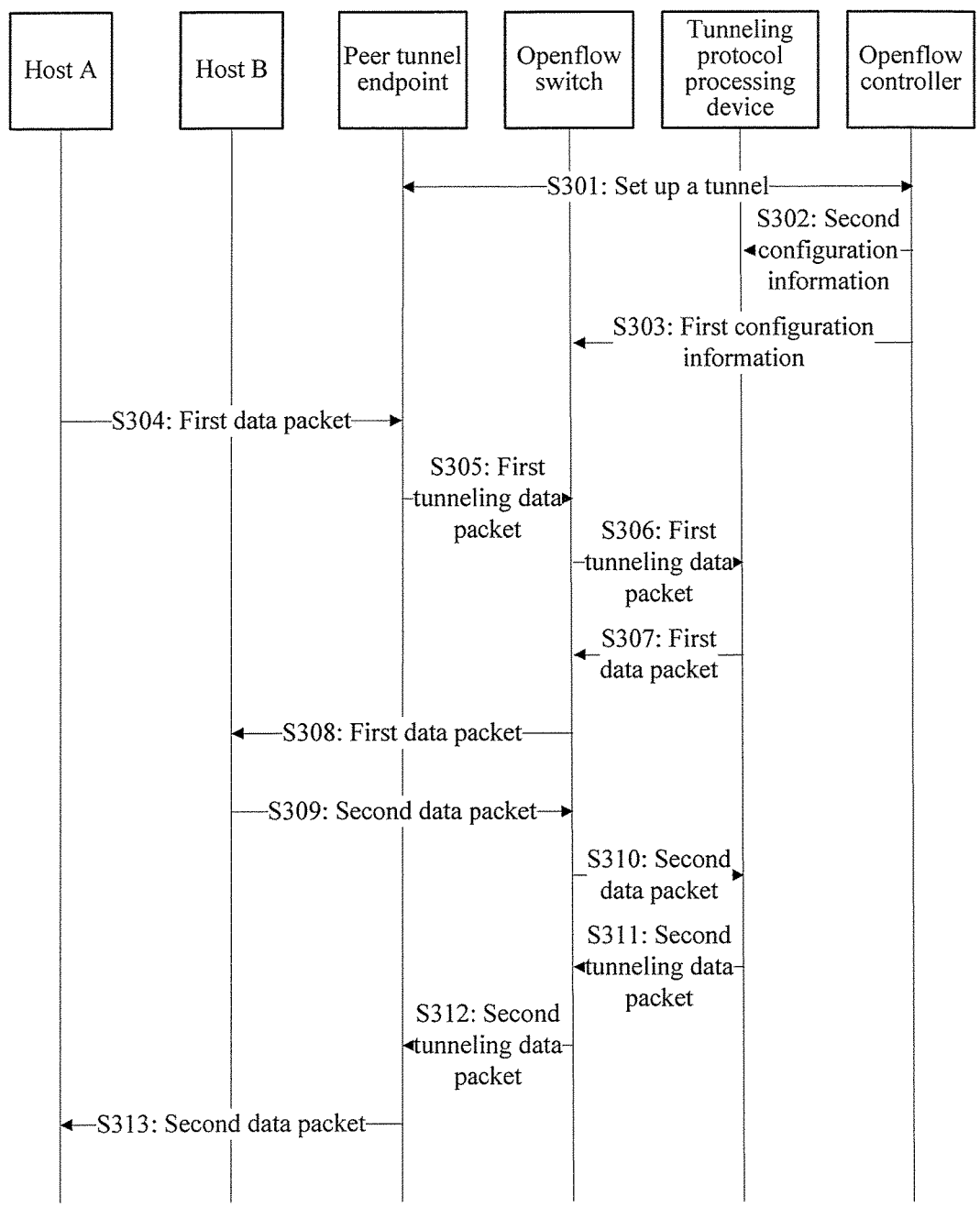
FIG. 5 is a schematic flowchart of still another method for implementing tunneling processing according to an embodiment of the present invention.

The following provides an exemplary description of the method for implementing tunneling processing according to the embodiment of the present invention with reference to the network architecture illustrated in FIG. 4 as shown in FIG. 5:

S301: An openflow controller sets up a tunnel with a peer tunnel endpoint.

Exemplarily, in a process of setting up the tunnel by the openflow controller and the peer tunnel endpoint, tunneling negotiation is performed; in the negotiation process, a tunneling protocol type of the tunnel, an IP address of the peer tunnel endpoint, a tunnel identifier assigned by the peer tunnel endpoint to the openflow switch, and tunneling context information such as a tunnel identifier assigned to the peer tunnel endpoint, and the like, may be determined. The openflow controller may determine, according to the tunneling context information obtained by negotiation, matching field information, a tunneling protocol type, and a tunneling operation type of a data packet requiring tunneling processing.

Exemplarily, as shown in Table 1, when a source IP address of a data packet is the IP address of the peer tunnel endpoint and a destination IP address is an IP address of the openflow switch, GTP decapsulation is performed on the data packet; and when a source IP address of a data packet is the IP address of the host B and a destination IP address is an IP address of the host A, GTP encapsulation operation is performed on the data packet.

TABLE 1

Examples of matching field information, tunneling protocol type, and tunneling operation type

| Matching field information | Tunneling protocol type | Tunneling operation type |
| --- | --- | --- |
| Source IP: IP address of the peer tunnel endpoint<br>Destination IP: IP address of the openflow switch | GTP | Decapsulate |
| Source IP: IP address of the host B<br>Destination IP: IP address of the host A | GTP | Encapsulate |

Exemplarily, if the peer tunnel endpoint is also an openflow switch and is connected to the openflow controller, the openflow controller may directly determine, according to a local policy or configuration, the tunneling context information such as the matching field information, tunneling protocol type, and tunneling operation type of the data packet requiring tunneling processing.

Exemplarily, the openflow controller may also send a request to the tunneling protocol processing apparatus for requesting a tunneling protocol type supported by the tunneling protocol processing apparatus, so that the openflow controller selects a tunneling protocol processing apparatus that can process a determined tunneling protocol type to perform tunneling processing. One implementation may be that: the openflow controller sends a tunneling processing capability request message to the tunneling protocol processing apparatus, and the tunneling protocol processing apparatus returns a tunneling protocol type supported thereby to the openflow controller.

This embodiment sets no limit to a sequence of executing S302 and S303.

S302. The openflow controller sends second configuration information to the tunneling protocol processing apparatus.

The description about step 103 in the embodiment illustrated in FIG. 1 may be referenced for the description of the second configuration information and the specific implementation of sending the second configuration information, which are not described repeatedly herein.

Exemplarily, the second configuration information in the embodiment may be a record in Table 1. That is, Table 1 includes two pieces of second configuration information, or all records in Table 1 are used as the second configuration information, where no limit is set herein. When the openflow controller sends the second configuration information, the information in Table 1 may be sent to the tunneling protocol processing apparatus in one message, or multiple pieces of second configuration information in Table 1 are sent to the tunneling protocol processing apparatus by using multiple messages, where the embodiment of the present invention sets no limit thereto.

Exemplarily, the tunneling protocol processing apparatus, upon receiving the second configuration information, may generate a local tunneling configuration table, and store the second configuration information as a tunneling configuration table entry in the tunneling configuration table, so as to save different second configuration information.

S303: The openflow controller sends first configuration information to the openflow switch.

Exemplarily, the embodiment illustrated in FIG. 1 may be referenced for the description of the first configuration information, which is not described repeatedly herein. One implementation of the first configuration information may be shown in Table 2, where the first configuration information includes matching field information and action indication information. When a source IP address of a data packet is the IP address of the peer tunnel endpoint and a destination IP is the IP address of the openflow switch, the data packet is sent to the tunneling protocol processing apparatus; and when a source IP address of a data packet is the IP address of the host B and a destination IP is the IP address of the host A, the data packet is sent to the tunneling protocol processing apparatus.

TABLE 2

Examples of first configuration information

| Matching field information | Action indication information |
|---|---|
| Source IP: IP address of the peer tunnel endpoint<br>Destination IP: IP address of the openflow switch | Send the data packet to the tunneling protocol processing apparatus |
| Source IP: IP address of the host B<br>Destination IP: IP address of the host A | Send the data packet to the tunneling protocol processing apparatus |

Exemplarily, one record in Table 2 may be one piece of first configuration information, or multiple records are one piece of first configuration information. The embodiment of the present invention sets no limit thereto.

Exemplarily, a specific implementation for the openflow controller to send the first configuration information to the openflow switch may be: sending, by the openflow controller, a flow modify message to the openflow switch, where the flow modify message carries the matching field information and the action indication information in Table 2. The openflow switch, upon receiving the flow modify message, may generate a flow table entry, where the flow table entry may be generated by creating a flow table entry or modifying a flow table entry. The flow table entry includes the matching field information and the action indication information. The openflow switch, upon receiving the data packet, may match the data packet with the matching field information; and if they are matched successfully, executes a corresponding action according to the corresponding action indication information. It should be noted that if multiple pieces of first configuration information need to be sent to the openflow switch, the openflow controller may send multiple flow modify messages to send the multiple pieces of first configuration information to the openflow switch.

Through the foregoing process, the tunneling protocol processing apparatus and the openflow switch both are configured with corresponding configuration information, and can perform corresponding processing when a data packet matching the matching field information goes through.

It is assumed that the host A needs to send a first data packet to the host B, which is illustrated in S304 to S308 by way of example as follows:

S304: The host A sends the first data packet to the peer tunnel endpoint.

S305: The peer tunnel endpoint performs tunneling encapsulation on the first data packet to obtain a first tunneling data packet, and sends the first tunneling data packet to the openflow switch.

S306: The openflow switch, upon receiving the first tunneling data packet, sends the first tunneling data packet to the tunneling protocol processing apparatus according to the first configuration information.

Exemplarily, one implementation may be that: the openflow switch matches the first tunneling data packet with a first flow table entry generated according to first matching information; and if the first tunneling data packet matches the first matching information, sends the first tunneling data packet to the corresponding tunneling protocol processing apparatus according to the action indication information of the first flow table entry.

S307: The tunneling protocol processing apparatus sends the first data packet obtained after the tunneling processing to the openflow switch.

Exemplarily, the tunneling protocol processing apparatus, upon receiving the first tunneling data packet, obtains second configuration information matching the first tunneling data packet according to the matching field information, for example, the tunneling configuration table may be queried to obtain the second configuration information matching the first tunneling data packet; performs corresponding processing on the first tunneling data packet according to the tunneling protocol type and the tunneling operation type in the matched second configuration information, for example, performs GTP decapsulation processing on the first tunneling data packet; and then sends the first data packet obtained after decapsulating the first tunneling data packet to the openflow switch.

Exemplarily, if the tunneling protocol processing apparatus has no second configuration information matching the first tunneling data packet, the tunneling protocol processing apparatus may send error indication information to the openflow controller for indicating that no second configuration information matches the first tunneling data packet. The openflow controller, upon receiving the error indication information, may deliver second configuration information matching the first tunneling data packet.

S308: The openflow switch sends the first data packet to the host B.

S304 to S308 exemplify the process of sending the data packet by the host A to the host B. The following S309 to S313 exemplify a process of sending a data packet by the host B to the host A, which is specifically as follows:

S309: The host B sends a second data packet to the openflow switch.

S310: The openflow switch sends the second data packet to the tunneling protocol processing apparatus.

Exemplarily, after the openflow switch receives the second data packet, the openflow switch sends the second data packet to the tunneling protocol processing apparatus according to first configuration information matching the second data packet. For example, the first configuration information is stored on the openflow switch in a form of a flow table entry. The openflow switch, upon receiving the second data packet, obtains the matching flow table entry according to the matching field information, and sends the second data packet to the tunneling protocol processing apparatus according to the action indication information corresponding to the flow table entry.

S311. The tunneling protocol processing apparatus sends a second tunneling data packet after encapsulation to the openflow switch.

Exemplarily, the tunneling protocol processing apparatus, upon receiving the second data packet, obtains second configuration information matching the second data packet according to stored second configuration information. For example, the second configuration information is stored in the tunneling configuration table in a form of a tunneling configuration table entry. The tunneling protocol processing apparatus searches the tunneling configuration table for the tunneling configuration table entry, that is, the second configuration information, matching the second data packet, and performs tunneling processing at least according to the tunneling protocol type and tunneling operation type therein. For example, in this embodiment, GTP encapsulation processing is performed on the second data packet according to the tunneling protocol type, the tunneling operation type, and other tunneling context information, and the second tunneling data packet obtained after the encapsulation processing is sent to the openflow switch.

S312: The openflow switch sends the second tunneling data packet to the peer tunnel endpoint.

S313: The peer tunnel endpoint decapsulates the second tunneling data packet to obtain the second data packet, and sends the second data packet to the host A.

S309 to S313 exemplify the process of sending the data packet by the host B to the host A.

According to the foregoing description, the method for implementing tunneling processing according to the embodiment of the present invention implements tunneling processing of multiple tunneling protocol types in an openflow network. This tunneling processing solution is easy for deployment and makes small changes to an existing system.

Figure 6:
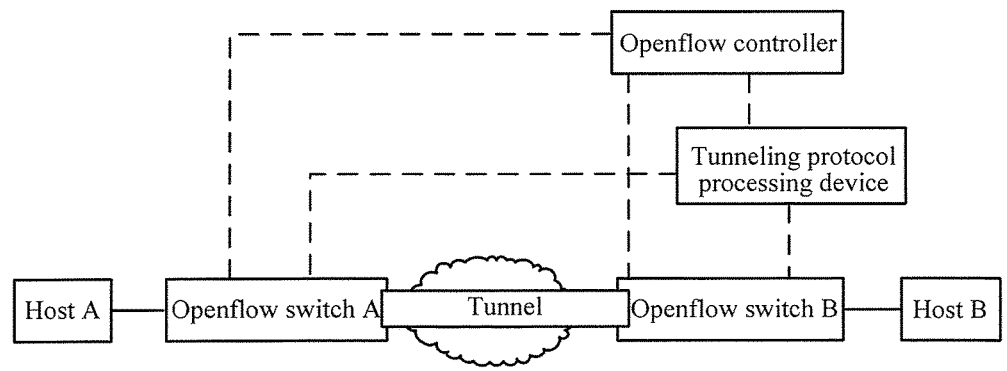
FIG. 6 is a schematic diagram of another network architecture according to an embodiment of the present invention.

Similarly, the method for implementing tunneling processing according to the embodiment of the present invention is also applicable to a scenario where both ends of a tunnel are an openflow switch. Exemplarily, as shown in FIG. 6, two ends of a tunnel are respectively an openflow switch A and an openflow switch B, where the openflow switch A and the openflow switch B are respectively connected to an openflow controller and a tunneling protocol processing apparatus. Compared with the scenario shown in FIG. 4, the openflow controller needs to configure corresponding configuration information on the openflow switch A and on the openflow switch B to control tunneling processing on a data packet. A person of ordinary skills in the art should be aware that the openflow switch A and the openflow switch B may also be connected to different tunneling protocol processing apparatuses or different openflow controllers.

Figure 7:
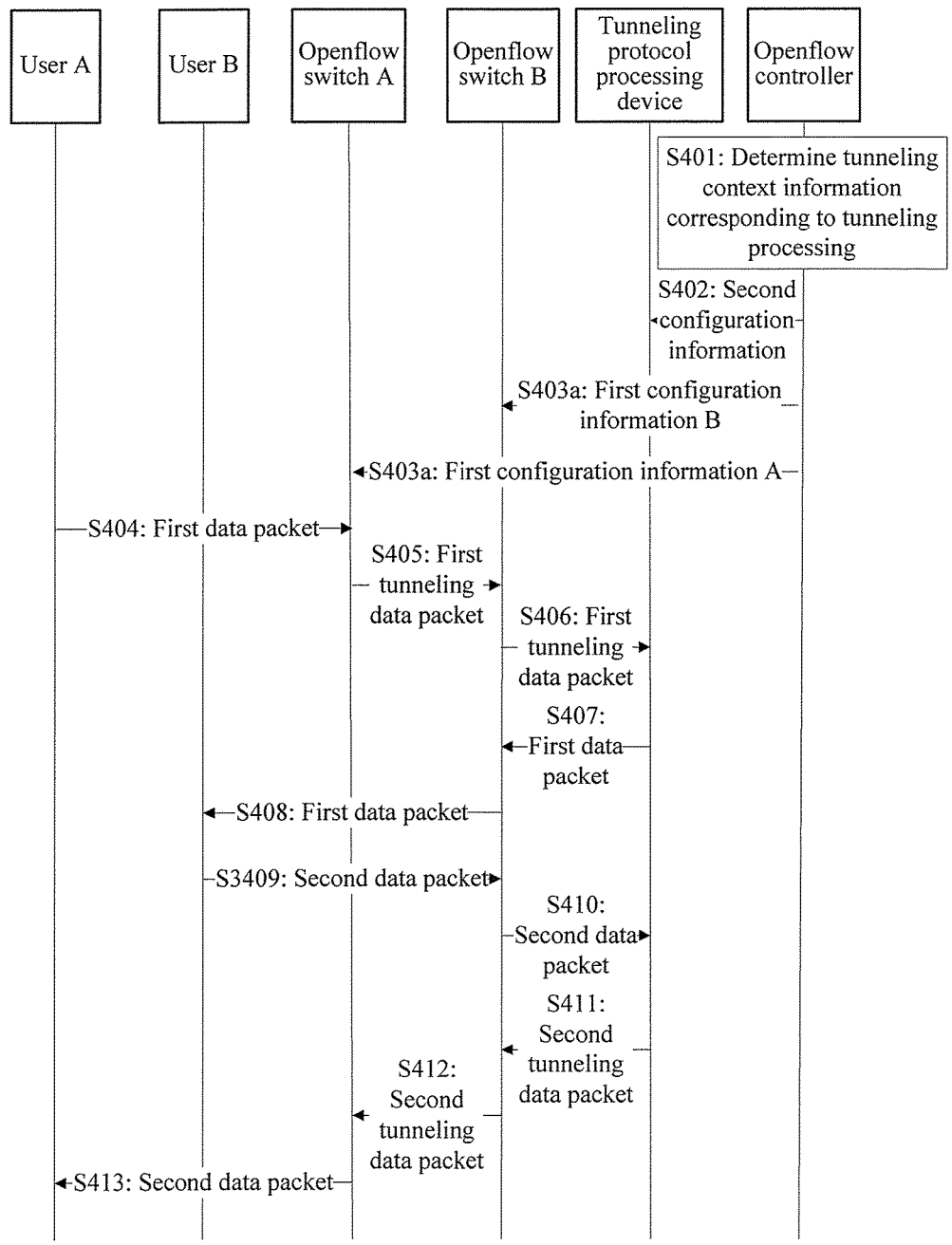
FIG. 7 is a schematic flowchart of still another method for implementing tunneling processing according to an embodiment of the present invention.

The following provides an exemplary description of the method for implementing tunneling processing according to the embodiment of the present invention with reference to FIG. 7.

S401: An openflow controller determines corresponding tunneling context information for performing tunneling processing.

Exemplarily, the openflow controller may determine the tunneling context information according to a local configuration or policy, where the tunneling context information may include a tunneling protocol type of a tunnel, IP addresses of tunnel endpoints on two ends, a tunnel identifier, other tunneling context information for tunneling encapsulation, and the like.

S402. The openflow controller sends second configuration information to a tunneling protocol processing apparatus.

Exemplarily, S302 may be referenced for the description of S402, which is not described repeatedly herein.

S403a: The openflow controller sends first configuration information B to an openflow switch B.

S403b: The openflow controller sends first configuration information A to an openflow switch A.

Exemplarily, S303 may be referenced for the description of S403a and S403b, which is not described repeatedly herein.

Through the forgoing process, the tunneling protocol processing apparatus, the openflow switch A, and the openflow switch B are all are configured with corresponding configuration information, and can perform corresponding processing when a data packet matching the matching field information goes through.

S304 to S313 may be referenced for S404 to S413. The openflow switch A, upon receiving a data packet, sends the data packet matching the matching field information to the tunneling protocol processing apparatus for processing, where the processing performed by the openflow switch in FIG. 5 may be referenced for the processing procedure, which is not described repeatedly herein.

Figure 8:
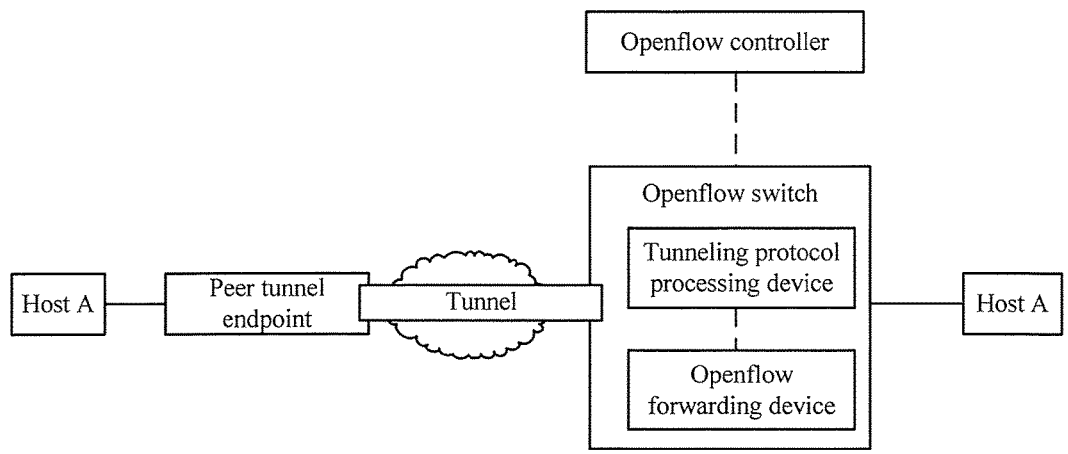
FIG. 8 is a schematic diagram of still another network architecture according to an embodiment of the present invention.

In an embodiment of the present invention, a tunneling protocol processing apparatus may also be integrated inside an openflow switch. Exemplarily, as shown in FIG. 8, an openflow switch includes a tunneling protocol processing apparatus and an openflow forwarding apparatus. In the network architecture illustrated in FIG. 8, an openflow controller sends first configuration information and second configuration information to an openflow switch; when the openflow switch receives a data packet, the openflow forwarding apparatus therein may send the data packet to the tunneling protocol processing apparatus inside the openflow switch according to the first configuration information; the tunneling protocol processing apparatus sends the data packet obtained after tunneling processing to the openflow forwarding apparatus; and the openflow forwarding apparatus forwards the data packet obtained after the tunneling processing. A specific application of the method for implementing tunneling processing according to the embodiment of the present invention in the network architecture illustrated in FIG. 8 requires only a simple variation on the embodiment illustrated in FIG. 5, which is not described repeatedly herein.

In order to implement the method for implement tunneling processing according to the embodiments of the present invention, an embodiment of the present invention further provides an openflow controller.

Figure 9:
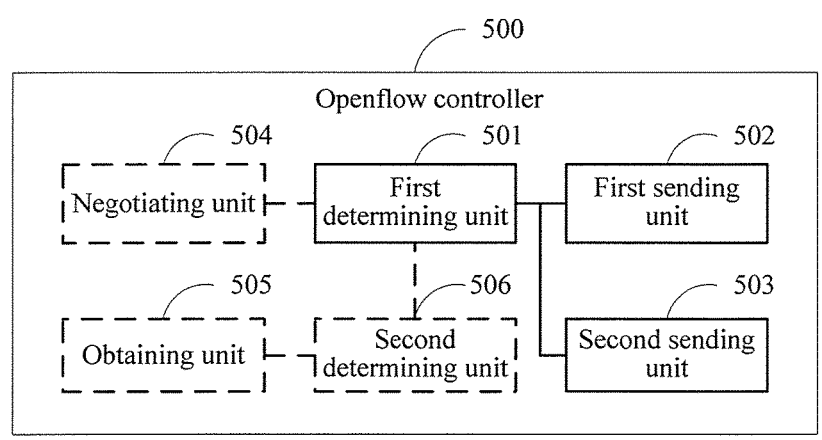
FIG. 9 is a schematic structural diagram of an openflow controller according to an embodiment of the present invention.

Exemplarily, as shown in FIG. 9, the openflow controller 500 includes:

a first determining unit 501, configured to determine matching field information, a tunneling protocol type, and a tunneling operation type of a data packet corresponding to tunneling processing;

a first sending unit 502, configured to send first configuration information to an openflow forwarding apparatus, where the first configuration information includes the matching field information and is used to give an instruction for sending a data packet matching the matching field information to a tunneling protocol processing apparatus; and a second sending unit 503, configured to send second configuration information to the tunneling protocol processing apparatus, where the second configuration information includes the tunneling operation type, the tunneling protocol type, and the matching field information, and is used to give an instruction for processing the data packet matching the matching field information according to the tunneling operation type and the tunneling protocol type, so that the tunneling protocol processing apparatus sends the processed data packet to the openflow forwarding apparatus.

Exemplarily, if the tunneling operation type is encapsulation, the first determining unit 501 is further configured to determine other tunneling context information corresponding to the tunneling processing, where the other tunneling context information is used to perform tunneling encapsulation. Correspondingly, in this case, the second configuration information further includes the other tunneling context information, and the second configuration information is used to give an instruction for encapsulating, according to the other tunneling context information and the tunneling protocol type, the data packet matching the matching field information.

Exemplarily, the openflow controller 500 may further includes a negotiating unit 504, configured to perform tunneling negotiation with a tunnel peer node. In the tunneling negotiation process, the tunneling context information corresponding to the tunneling processing may be determined. It should be noted that in the embodiment of the present invention, the tunnel peer node may also be referred to as a tunnel peer point, a peer tunnel endpoint, or a peer tunnel node, and the like, where the embodiment of the present invention sets no limit thereto.

Exemplarily, the openflow controller 500 may further include an obtaining unit 505 and a second determining unit 506. The obtaining unit 505 is configured to obtain a tunneling protocol type supported by the tunneling protocol processing apparatus. The second determining unit 506 is configured to determine the tunneling protocol type as the tunneling protocol type supported by the tunneling protocol processing apparatus.

The embodiment illustrated in FIG. 1, FIG. 5, or FIG. 7 may be referenced for a specific mechanism for the openflow controller 500 to specifically implement the method for implementing tunneling processing according to the embodiments of the present invention, which is not described repeatedly herein.

Figure 10:
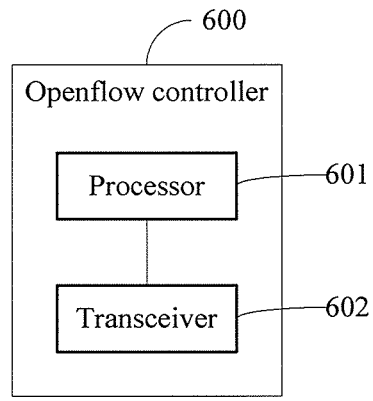
FIG. 10 is a schematic structural diagram of another openflow controller according to an embodiment of the present invention.

As another alternative implementation, an embodiment of the present invention further provides an openflow controller 600. As shown in FIG. 10, the openflow controller 600 includes a processor 601 and a transceiver 602. The processor 601 is connected to the transceiver 602.

The processor 601 is configured to determine matching field information, a tunneling protocol type, and a tunneling operation type of a data packet corresponding to tunneling processing; the transceiver 602 is configured to send first configuration information to an openflow forwarding apparatus, where the first configuration information includes the matching field information and is used to give an instruction for sending a data packet matching the matching field information to a tunneling protocol processing apparatus; and the transceiver 602 is further configured to send second configuration information to the tunneling protocol processing apparatus, where the second configuration information includes the tunneling operation type, the tunneling protocol type, and the matching field information, and is used to give an instruction for processing, according to the tunneling operation type and the tunneling protocol type, the data packet matching the matching field information.

Exemplarily, if the tunneling operation type is encapsulation, the processor 601 is further configured to determine other tunneling context information corresponding to the tunneling processing; and correspondingly, the second configuration information further includes the other tunneling context information and is used to give an instruction for encapsulating, according to the other tunneling context information and the tunneling protocol type, the data packet matching the matching field information.

Exemplarily, the processor 601 is further configured to perform tunneling negotiation with a tunnel peer node.

Exemplarily, the transceiver 602 is further configured to obtain a tunneling protocol type supported by the tunneling protocol processing apparatus. Correspondingly, the processor 601 is further configured to determine the determined tunneling protocol type as the tunneling protocol type supported by the tunneling protocol processing apparatus.

The embodiment illustrated in FIG. 1, FIG. 5, or FIG. 7 may be referenced for a specific mechanism for the openflow controller 600 to specifically implement the method for implementing tunneling processing according to the embodiments of the present invention, which is not described repeatedly herein.

The openflow controller according to the embodiment of the present invention sends the first configuration information to the openflow forwarding apparatus, so that the openflow forwarding apparatus sends the data packet requiring tunneling processing to the tunneling protocol processing apparatus; the openflow controller sends the second configuration information to the tunneling protocol processing apparatus, so that the tunneling protocol processing apparatus performs tunneling processing of different tunneling protocol types and different tunneling operation types on the corresponding data packet according to the second configuration information, and sends the data packet on which tunneling processing is performed to the openflow forwarding apparatus, so as to implement tunneling processing of multiple tunneling protocol types in an openflow network. This tunneling processing solution is easy for deployment and makes small changes to an existing system.

Correspondingly, an embodiment of the present invention further provides a tunneling protocol processing apparatus for implementing the method for implementing tunneling processing according to the embodiment of the present invention.

Figure 11:
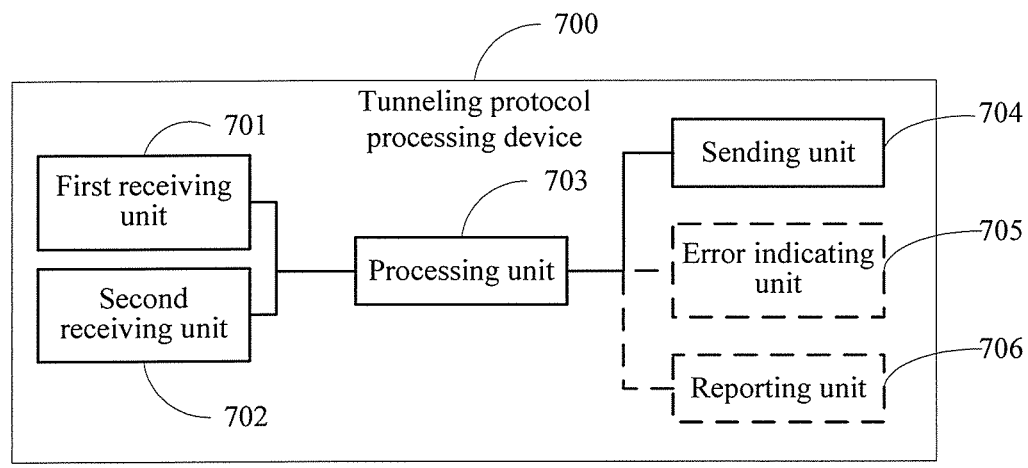
FIG. 11 is a schematic structural diagram of a tunneling protocol processing apparatus according to an embodiment of the present invention.

Exemplarily, as shown in FIG. 11, a tunneling protocol processing apparatus 700 includes:

a first receiving unit 701, configured to receive second configuration information sent by an openflow controller, where the second configuration information includes matching field information, a tunneling operation type, and a tunneling protocol type of a data packet corresponding to tunneling processing, and is used to give an instruction for processing, according to the tunneling operation type and the tunneling protocol type, a data packet matching the matching field information;

a second receiving unit 702, configured to receive a first data packet sent by an openflow forwarding apparatus;

a processing unit 703, configured to process, when the first data packet matches the matching field information, the first data packet according to the tunneling operation type and tunneling protocol type; and a sending unit 704, configured to send the data packet obtained after processing the first data packet to the openflow forwarding apparatus.

Exemplarily, the tunneling protocol processing apparatus 700 further includes an error indicating unit 705, configured to send, if the first data packet does not match the matching field information, error indication information to the openflow controller, where the error indication information indicates that no second configuration information matches the first data packet.

Exemplarily, the tunneling protocol processing apparatus 700 further includes a reporting unit 706, configured to send a tunneling protocol type supported by the tunneling protocol type to the openflow controller, so that the openflow controller sends the second configuration information according to the tunneling protocol type supported by the tunneling protocol processing apparatus.

Exemplarily, if the tunneling operation type is encapsulation, the second configuration information further includes other tunneling context information corresponding to the tunneling processing; and correspondingly, the processing unit 703 is configured to encapsulate the first data packet according to the other tunneling context information and the tunneling protocol type.

The embodiment illustrated in FIG. 2, FIG. 5, or FIG. 7 may be referenced for a specific mechanism for the tunneling protocol processing apparatus 700 to specifically implement the method for implementing tunneling processing according to the embodiments of the present invention, which is not described repeatedly herein.

Figure 12:
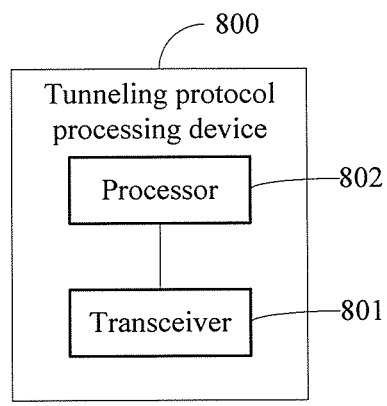
FIG. 12 is a schematic structural diagram of another tunneling protocol processing apparatus according to an embodiment of the present invention.

As another alternative implementation, an embodiment of the present invention further provides a tunneling protocol processing apparatus 800, as shown in FIG. 12, including a transceiver 801 and a processor 802, where:

the transceiver 801 is configured to receive second configuration information sent by an openflow controller, receive a first data packet sent by an openflow forwarding apparatus, and send a data packet obtained after processing the first data packet to the openflow forwarding apparatus, where the second configuration information includes matching field information, a tunneling operation type, and a tunneling protocol type of a data packet corresponding to tunneling processing, and is used to give an instruction for processing, according to the tunneling operation type and the tunneling protocol type, the data packet matching the matching field information; and the processor 802 is configured to process, when the first data packet matches the matching field information, the first data packet according to the tunneling operation type and tunneling protocol type.

Exemplarily, the transceiver 801 is further configured to send, if the first data packet does not match the matching field information, error indication information to the openflow controller, where the error indication information indicates that no second configuration information matches the first data packet.

Exemplarily, the transceiver 801 is further configured to send a tunneling protocol type supported by the tunneling protocol processing apparatus 800 to the openflow controller, so that the openflow controller sends the second configuration information according to the tunneling protocol type supported by the tunneling protocol processing apparatus.

Exemplarily, if the tunneling operation type is encapsulation, the second configuration information further includes other tunneling context information corresponding to the tunneling processing; and correspondingly, the processor 802 is configured to encapsulate the first data packet according to the other tunneling context information and the tunneling protocol type.

The tunneling protocol processing apparatus according to the embodiment of the present invention receives the second configuration information sent by the openflow controller; and upon receiving the data packet, if the data packet can match the matching field information in the second configuration information, processes the data packet according to the tunneling operation type and the tunneling protocol type in the second configuration information, and sends the data packet obtained after processing to the openflow forwarding apparatus, which implements tunneling processing of multiple tunneling protocol types in an openflow network. This tunneling processing solution is easy for deployment and makes small changes to an existing system.

Figure 13:
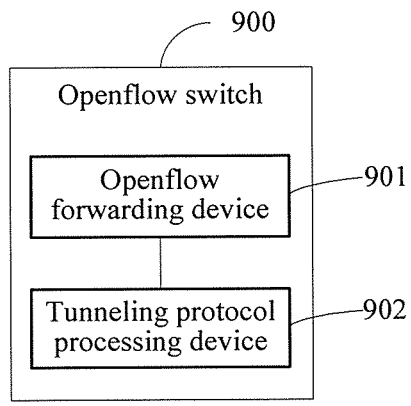
FIG. 13 is an openflow switch according to an embodiment of the present invention.

As another possible implementation, the tunneling processing apparatus may also be integrated on the openflow switch. Exemplarily, an openflow switch 900 illustrated in FIG. 13 includes an openflow forwarding apparatus 901 and a tunneling protocol processing apparatus 902, where the tunneling protocol processing apparatus 902 may be illustrated in FIG. 11 or FIG. 12.

Figure 14:
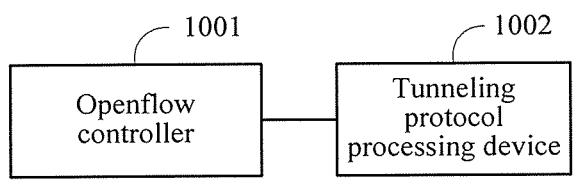
FIG. 14 is a schematic structural diagram of a system for implementing tunneling processing according to an embodiment of the present invention.

As another possible implementation, the tunneling processing apparatus may further form a system for implementing tunneling processing with an openflow controller. Exemplarily, a system for implementing tunneling processing illustrated in FIG. 14 includes an openflow controller 1001 and a tunneling protocol processing apparatus 1002, where the openflow controller 1001 may be illustrated in FIG. 9 or FIG. 10, and the tunneling protocol processing apparatus 1002 may be illustrated in FIG. 11 or FIG. 12.

Understandably, the term "and/or" herein denotes only an association relationship between associated objects, and represents three possible relationships. For example, "A and/or B" may represent the following three cases: A alone, both A and B, and B alone. In addition, a character "/" herein generally means that an object before the character and an associated object after the character are in an "or" relationship.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It can be clearly understood by a person skilled in the art that, for the purpose of convenient and brief description, for a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units herein may be selected according to the actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device, which may be a personal computer, a server, or a network device, to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any equivalent modification or replacement figured out by a person skilled in the art within the technical scope of the present invention shall fall within the protection scope of the present invention. Therefore, the protection scope of the present invention shall be subject to the protection scope of the claims.

What is claimed is:

1. A method for implementing tunneling processing, the method comprising:
   determining, by an openflow controller, matching field information, a tunneling protocol type that is one of a GPRS tunneling protocol (GTP) or a generic routing encapsulation protocol (GRE), and a tunneling operation type of a data packet corresponding to tunneling processing, wherein the tunneling operation type is one of encapsulation, decapsulation, encryption, or decryption;
   determining, by the openflow controller, whether the tunneling protocol type is supported by a tunneling protocol processing apparatus, wherein the tunneling protocol processing apparatus is provided independently of the openflow controller and any openflow switches and is connected to multiple openflow switches;
   when the tunneling protocol type is supported by the tunneling protocol processing apparatus, selecting, by the openflow controller, the tunneling protocol processing apparatus to perform the corresponding tunneling processing;
   sending, by the openflow controller, first configuration information to an openflow forwarding apparatus in an openflow switch, wherein the first configuration information comprises the matching field information and is used to give an instruction for sending a data packet matching the matching field information to a tunneling protocol processing apparatus; and
   sending, by the openflow controller, second configuration information to the tunneling protocol processing apparatus, wherein the second configuration infounation comprises the tunneling operation type, the tunneling protocol type, and the matching field information, and is used to give an instruction for processing, according to the tunneling operation type and the tunneling protocol type, the data packet matching the matching field information, and for instructing the tunneling protocol processing apparatus to send the processed data packet to the openflow forwarding apparatus.

2. The method according to claim 1, wherein:
   when the tunneling operation type is encapsulation, the method comprises: determining, by the openflow controller, other tunneling context information corresponding to the tunneling processing; and
   the second configuration information comprises the other tunneling context information, and is used to give an instruction for encapsulating, according to the other tunneling context information and the tunneling protocol type, the data packet matching the matching field information.

3. The method according to claim 1, wherein before determining, by the openflow controller, the matching field information, the tunneling protocol type, and the tunneling operation type of the data packet corresponding to the tunneling processing, the method comprises:
   performing, by the openflow controller, tunneling negotiation with a tunnel peer node.

4. The method according to claim 1, comprising:
   obtaining, by the openflow controller, a tunneling protocol type supported by the tunneling protocol processing apparatus; and
   determining, by the openflow controller, the tunneling protocol type as the tunneling protocol type supported by the tunneling protocol processing apparatus.

5. The method according to claim 3, comprising:
   obtaining, by the openflow controller, a tunneling protocol type supported by the tunneling protocol processing apparatus; and
   determining, by the openflow controller, the tunneling protocol type as the tunneling protocol type supported by the tunneling protocol processing apparatus.

6. An openflow controller, comprising:
   a processor configured to:
      determine matching field information, a tunneling protocol type that is one of a GPRS tunneling protocol (GTP) or a generic routing encapsulation protocol (GRE), and a tunneling operation type of a data packet corresponding to tunneling processing, wherein the tunneling operation type is one of encapsulation, decapsulation, encryption, or decryption, determine whether the tunneling protocol type is supported by a tunneling protocol processing apparatus, wherein the tunneling protocol processing apparatus is provided independently of the openflow controller and any openflow switches and is connected to multiple openflow switches, and when the tunneling protocol type is supported by the tunneling protocol processing apparatus, selecting, by the openflow controller, the tunneling protocol processing apparatus to perform the corresponding tunneling processing; and a transceiver connected to the processor and configured to:

send first configuration information to an openflow forwarding apparatus, wherein the first configuration information comprises the matching field information and is used to give an instruction for sending a data packet matching the matching field information to a tunneling protocol processing apparatus, and send second configuration information to the tunneling protocol processing apparatus, wherein the second configuration information comprises the tunneling operation type, the tunneling protocol type, and the matching field information, and is used to give an instruction for processing, according to the tunneling operation type and the tunneling protocol type, the data packet matching the matching field information to instruct the tunneling protocol processing apparatus to send the processed data packet to the openflow forwarding apparatus.

7. The openflow controller according to claim 6, wherein:

when the tunneling operation type is encapsulation, the processor is configured to determine other tunneling context information corresponding to the tunneling processing; and the second configuration information comprises the other tunneling context information, and is used to give an instruction for encapsulating, according to the other tunneling context information and the tunneling protocol type, the data packet matching the matching field information.

8. The openflow controller according to claim 6, the processor is configured to perform tunneling negotiation with a tunnel peer node.

9. The openflow controller according to claim 6, wherein:

the transceiver is configured to obtain a tunneling protocol type supported by the tunneling protocol processing apparatus; and the processor is configured to determine the tunneling protocol type as the tunneling protocol type supported by the tunneling protocol processing apparatus.

10. The openflow controller according to claim 8, wherein:

the transceiver is configured to obtain a tunneling protocol type supported by the tunneling protocol processing apparatus; and the processor is configured to determine the tunneling protocol type as the tunneling protocol type supported by the tunneling protocol processing apparatus.

11. A tunneling protocol processing apparatus, comprising:

a transceiver and a processor;

wherein the transceiver is configured to receive second configuration information sent by an openflow controller, wherein the second configuration information comprises matching field information, a tunneling protocol type that is one of a GPRS tunneling protocol (GTP) or a generic routing encapsulation protocol (GRE), and a tunneling operation type of a data packet corresponding to tunneling processing, wherein the tunneling operation type is one of encapsulation, decapsulation, encryption, or decryption, and is used to give an instruction for processing, according to the tunneling operation type and the tunneling protocol type, a data packet matching the matching field information, and receive a first data packet sent by an openflow forwarding apparatus;

wherein the processor is configured to process, when the first data packet matches the matching field information, the first data packet according to the tunneling operation type and tunneling protocol type; and wherein the transceiver is configured to send the data packet obtained after processing the first data packet to the openflow forwarding apparatus, wherein the tunneling protocol processing apparatus is independent of the openflow controller and any openflow switches and is connected to multiple openflow switches.

12. The tunneling protocol processing apparatus according to claim 11, wherein the transceiver is configured to send error indication information to the openflow controller when the first data packet does not match the matching field information, and wherein the error indication information indicates that no second configuration information matches the first data packet.

13. The tunneling protocol processing apparatus according to claim 11, wherein the transceiver is configured to send a tunneling protocol type supported by the tunneling protocol processing apparatus to the openflow controller for enabling the openflow controller to send the second configuration information according to the tunneling protocol type supported by the tunneling protocol processing apparatus.

14. The tunneling protocol processing apparatus according to claim 12, wherein the transceiver is configured to send a tunneling protocol type supported by the tunneling protocol processing apparatus to the openflow controller for enabling the openflow controller to send the second configuration infolination according to the tunneling protocol type supported by the tunneling protocol processing apparatus.

15. The tunneling protocol processing apparatus according to claim 11, wherein:

when the tunneling operation type is encapsulation, the second configuration information comprises other tunneling context information corresponding to the tunneling processing; and the processor is configured to encapsulate the first data packet according to the other tunneling context information and the tunneling protocol type.

16. The tunneling protocol processing apparatus according to claim 12, wherein:

when the tunneling operation type is encapsulation, the second configuration information comprises other tunneling context information corresponding to the tunneling processing; and the processor is configured to encapsulate the first data packet according to the other tunneling context information and the tunneling protocol type.

17. The tunneling protocol processing apparatus according to claim 13, wherein:
- when the tunneling operation type is encapsulation, the second configuration information comprises other tunneling context information corresponding to the tunneling processing; and
- the processor is configured to encapsulate the first data packet according to the other tunneling context information and the tunneling protocol type.

18. The tunneling protocol processing apparatus according to claim 14, wherein:
- when the tunneling operation type is encapsulation, the second configuration information comprises other tunneling context information corresponding to the tunneling processing; and
- the processor is configured to encapsulate the first data packet according to the other tunneling context information and the tunneling protocol type.

* * * * *